Sept. 1, 1970 G. BRINKMANN ET AL 3,526,740
PROCESS FOR SUPPLYING GAS MIXTURES TO WELDING
AND CUTTING APPARATUS
Filed Feb. 10, 1969
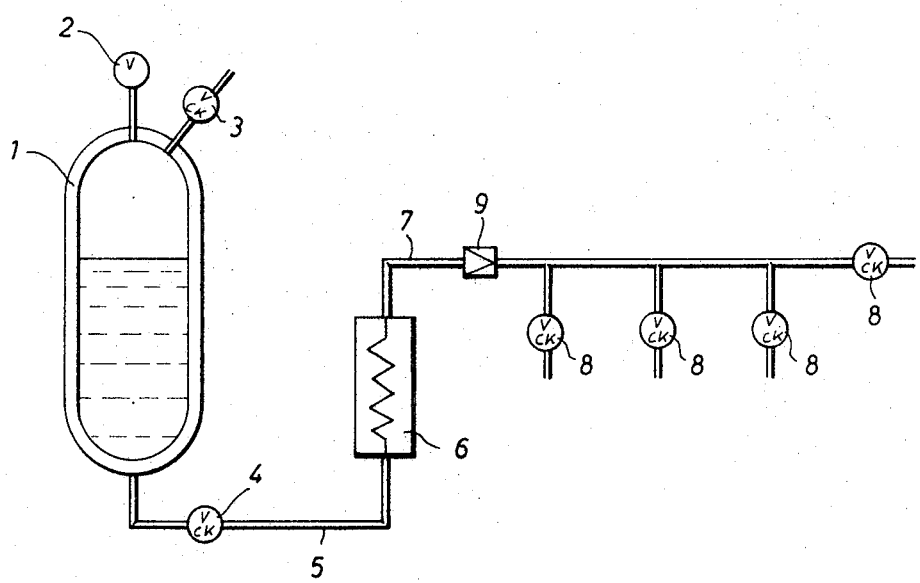

3,526,740
PROCESS FOR SUPPLYING GAS MIXTURES TO WELDING AND CUTTING APPARATUS
Georg Brinkmann, Hubbelrath, and Heinrich Schrader, Hochdahl, Germany, assignors to Messer Griesheim GmbH, Frankfurt am Main, Germany, a corporation of Germany
Filed Feb. 10, 1969, Ser. No. 798,046
Claims priority, application Germany, Feb. 14, 1968, 1,667,199
Int. Cl. B23k 9/16, 35/38
U.S. Cl. 219—74      1 Claim

ABSTRACT OF THE DISCLOSURE

Liquid oxygen and liquid argon are mixed, then vaporized and then supplied as a protective gas mixture to a welding and cutting apparatus.

BACKGROUND OF INVENTION

This invention relates to a process for the supplying of protective gas mixtures of argon and oxygen to a welding and cutting apparatus. For the protective gas welding with current conducting and self-consuming wire electrode, protective gas mixtures, such as argon and oxygen, are known as well as other mixtures. In this connection, the protective gas mixture is delivered to the user ready-mixed in gaseous state in steel cylinders. Because of the delivery of the mixture in a gaseous state, the transportation costs are very high. In addition, expensive regulators are required in order to maintain the requisite mixture ratio in bottling the gases. Large-scale users who undertake the mixing in their own plants also require the expensive regulators, which must maintain the mixture ratio under various tapping load grades.

SUMMARY OF INVENTION

The object of this invention is to decrease the above stated cost factors.

A process has now been found for the supplying of welding and cutting apparatus with protective gas mixtures of argon and oxygen which, according to the invention, is characterized in that the mixture is formed by mixing liquid oxygen and liquid argon, then vaporizing the mixture and supplying it to the welding and cutting apparatus. By extraction of the protective gas mixture from the cold vaporizer, no separation of the phases is effected detrimental to the subsequent use.

In almost all protective gas welding with argon-oxygen mixtures it is permissible to allow some nitrogen (up to about 1%) as an impurity.

Since in vaporizing the liquid mixture contaminated with nitrogen, neither a separation worth mentioning nor an undue concentration of the nitrogen is caused, there results as an advantage that the liquid argon produced in air separation plants does not have to be obtained in a condition of highest purity, and instead, a certain contamination by nitrogen is allowable. The same holds true for the admixed oxygen. The production costs, particularly of argon, can thus be kept low. The mixing itself is very simple—the specified mixture ratio can be easily maintained; complicated regulators, as are required for mixing gaseous oxygen and argon, are eliminated. Transportation costs are considerably lower in comparison to delivering in gaseous state. The maintenance of supplies is made more easy. The supplying of the operating stations becomes independent of delivery fluctuations.

THE DRAWING

In the drawing an exemplary embodiment of the invention is schematically illustrated.

DETAILED DESCRIPTION

The protective gas mixture is located in the well heat-insulated container 1. On demand, container 1 is filled through short filling pipe 3 which is provided with a shutoff valve. The desired pressure is maintained over the liquid by way of safety valve 2. The protective gas flows into vaporizer 6 as a liquid through shutoff valve 4 and conduit 5. In the vaporizer it is vaporized and flows through conduit 7, pressure mixing device 9 and shutoff valves 8 to the individual users.

By means of the novel process, the preparation of the protective gas mixture argon-oxygen is considerably simplified and made less expensive. Since the expensive regulators for mixing of gases are eliminated, in certain instances the mixing of the liquid components can also be undertaken by the customer.

What is claimed is:

1. A process for supplying welding and cutting apparatus with protective gas mixtures of argon and oxygen, characterized in that the mixture is formed by mixing liquid oxygen and liquid argon, storing and transporting the mixture while in liquid form, and vaporizing the mixture in situ immediately prior to its being supplied to the apparatus.

References Cited

UNITED STATES PATENTS

| | | | |
|---|---|---|---|
| 1,746,209 | 2/1930 | Alexander | 219—74 |
| 1,855,898 | 4/1932 | Alexander | 219—74 |
| 1,935,593 | 11/1933 | Wist | 219—74 |
| 1,963,729 | 6/1934 | Alexay | 219—74 |
| 2,768,278 | 10/1956 | Gaines | 219—74 |
| 2,824,948 | 2/1958 | Van der Willigen et al. | 219—74 |
| 2,852,659 | 9/1958 | Belz et al. | 219—74 |
| 2,870,320 | 1/1959 | Mathews | 219—74 |
| 2,908,800 | 10/1959 | Breymeier | 219—74 |
| 3,143,631 | 8/1964 | Sohn et al. | 219—74 |
| 3,253,113 | 5/1966 | Breymeier | 219—74 |

JOSEPH V. TRUHE, Primary Examiner

W. D. BROOKS, Assistant Examiner